United States Patent [19]
Langnickel et al.

[11] Patent Number: 5,455,463
[45] Date of Patent: Oct. 3, 1995

[54] METHOD AND APPARATUS FOR REGULATING THE POWER SUPPLY VOLTAGE IN MOTOR VEHICLES

[75] Inventors: Wolfgang Langnickel, Meine; Wilhelm Trautmann, Calberlah; Paulus Heidemeyer, Wolfsburg, all of Germany

[73] Assignee: Volkswagen AG, Wolfsburg, Germany

[21] Appl. No.: 12,590

[22] Filed: Feb. 3, 1993

[30] Foreign Application Priority Data

Feb. 13, 1992 [DE] Germany ............ 42 04 277.1

[51] Int. Cl.⁶ .................. H02H 7/18; H02J 7/35; H02J 9/06
[52] U.S. Cl. .................... 307/10.1; 307/66; 307/10.7
[58] Field of Search .................... 361/191, 183, 361/206, 166, 160; 326/15, 5–6; 307/64–67, 101, 10.6–10.8

[56] References Cited

U.S. PATENT DOCUMENTS 4,210,855 7/1980 Harer et al. .................. 320/13

5,157,271 9/1992 Fujiwara et al. .............. 307/66

FOREIGN PATENT DOCUMENTS

| 0031225 | 7/1981 | European Pat. Off. . |
| 2298892 | 8/1976 | France . |
| 3228600 | 3/1983 | Germany . |
| 8815410 | 3/1989 | Germany . |
| 9007412 | 7/1991 | Germany . |
| 4028242 | 3/1992 | Germany . |

*Primary Examiner*—Steven L. Stephan
*Assistant Examiner*—Aditya Krishnan
*Attorney, Agent, or Firm*—Brumbaugh, Graves, Donohue & Raymond

[57] ABSTRACT

For fuel economy, it is known that the engine of a motor vehicle may be turned off during vehicle operation while the electrical power for various appliances, such as the lighting circuit or the radio must be maintained. Upon restarting the engine, there may be a voltage drop in the vehicle supply circuit voltage with deteriorating effects in the lighting circuit and possibly failure of the radio. The disclosed circuit prevents such effects by limiting the rate of change of variations in vehicle supply circuit voltage as a function of connecting and disconnecting of a high-power component such as the starter.

24 Claims, 3 Drawing Sheets

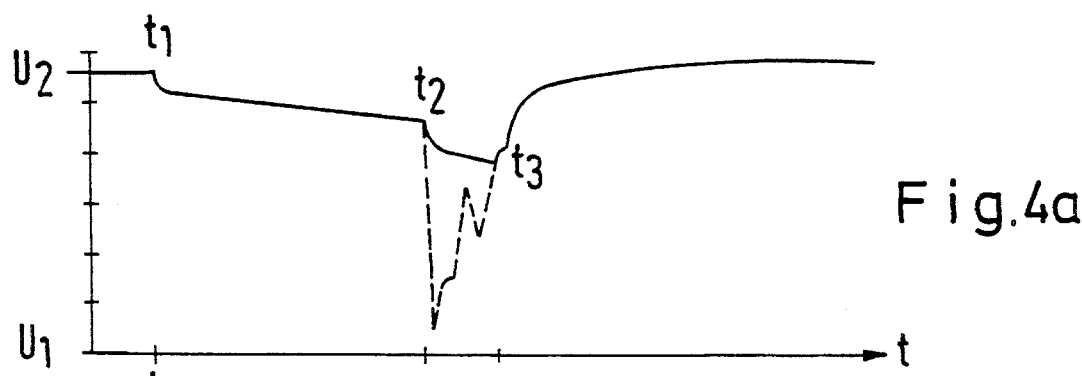
Fig.4a
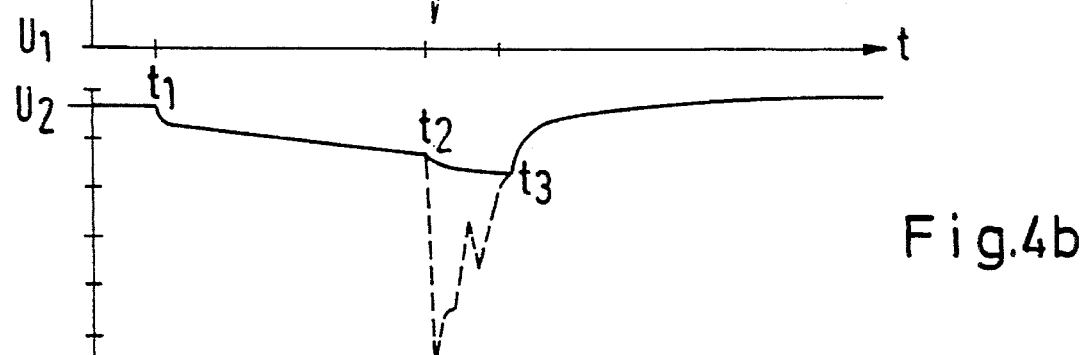
Fig.4b
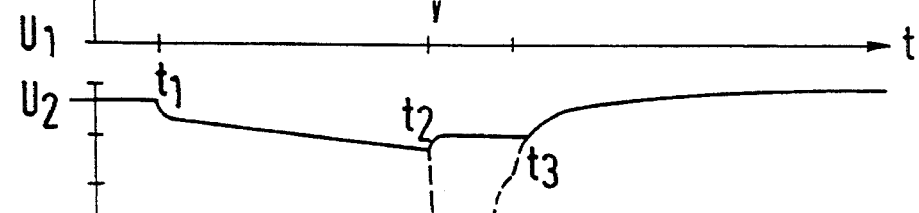
Fig.4c
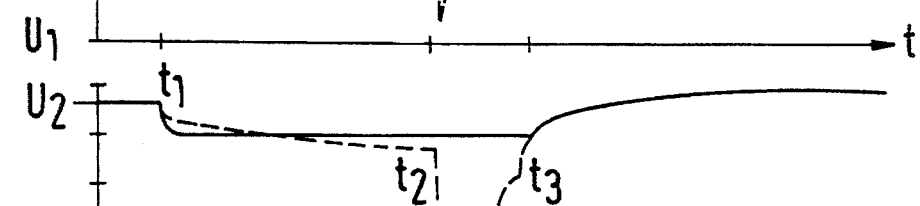
Fig.4d
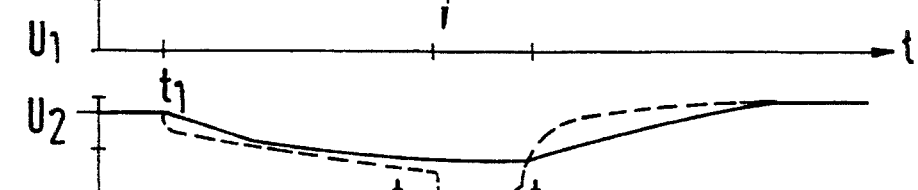
Fig.4e
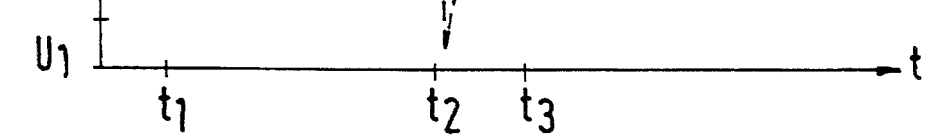

METHOD AND APPARATUS FOR REGULATING THE POWER SUPPLY VOLTAGE IN MOTOR VEHICLES

BACKGROUND OF THE INVENTION

This invention relates to the regulation of the power supply voltage for a motor vehicle having at least one high-power operating component, such as a starter for an internal combustion engine, and one or more lower-power components such as a lighting circuit.

In the past, during normal operation of a motor vehicle, the internal combustion engine was turned off only in exceptional cases, and only when the vehicle was stationary. More recently, experiments have been carried out in which the internal combustion engine is turned off while the vehicle is coasting, or during brief stops, for the purpose of saving energy. In these conditions, the operation of the electrical components in the vehicle that are normally supplied by the vehicle generator when the engine is running must be continued, especially when the vehicle is still coasting, for example, in the driven mode. The battery provided with the vehicle must be designed to satisfy this requirement but, when the engine is restarted, the starter places a heavy load on the battery. As a result, the voltage in the power supply circuit of the vehicle drops abruptly. Certain electrical components such as a radio may suffer a loss of function because of this sudden voltage drop. In addition, a distinctly noticeable flicker will occur in the vehicle lights, especially the headlights and tail-lights.

SUMMARY OF THE INVENTION

Accordingly, it is an object of the present invention to provide a method and apparatus for regulating the power supply voltage in motor vehicles which overcomes the disadvantages of the prior art.

Another object of the invention is to ameliorate or, if possible, prevent side effects which can occur due to actuation of high-power electrical components, for example, deterioration of the operation of other electrical components.

These and other objects of the invention are attained by limiting the rate of change of the vehicle power supply voltage available for low-power vehicle components, as a function of the connecting and disconnecting of vehicle components or of the vehicle generator to the power supply. Certain electrical components are comparatively insensitive to slow variations in supply voltage. Lower rates of change of the supply voltage are likewise advantageous for the lighting system of a motor vehicle. In this regard, the distracting effect of flickering headlights occurs only when the change in light intensity exceeds a specific threshold of perception by the human eye. Slow changes in light intensity, and a concomitant gradual flicker of the head-lights, are not noticed by the eye. In a preferred embodiment of the invention, the supply voltage is maintained at a constant level so that the rate of change is zero.

In one embodiment of the invention, an auxiliary battery is connected in parallel with the main battery for the vehicle and arranged so that, when a high-power component, such as the starter, draws power from the main battery of the vehicle, the vehicle supply circuit voltage, i.e., the voltage available for low-power components, is supplied by the auxiliary battery, which is then disconnected from the main battery of the vehicle. Thus, the voltage drop of the main battery output caused by operation of the starter will not affect the voltage supply for the low-power components.

The apparatus according to the invention includes an arrangement for limiting the rate of change of the supply voltage as a function of the connecting and disconnecting of electrical components and/or of the vehicle generator to the vehicle power supply.

This arrangement may in particular include auxiliary voltage supply capable of being connected in parallel with the main battery. Preferably, the rated voltages of the main battery and of the auxiliary voltage supply are about the same.

In another embodiment, an auxiliary voltage supply capable of being connected in series with the main battery is provided. When a high-power electrical component such as a starter is actuated, the voltage drop is compensated by the additional voltage from the auxiliary supply.

BRIEF DESCRIPTION OF THE DRAWINGS

Further objects and advantages of the invention will be apparent from a reading of the following description in conjunction with the accompanying drawings, in which:

FIGS. 4a–4e are graphical illustrations showing typical voltage versus time relationships representing the voltage variations encountered during use in the various embodiments of the invention.

DESCRIPTION OF PREFERRED EMBODIMENTS

Figure 1:
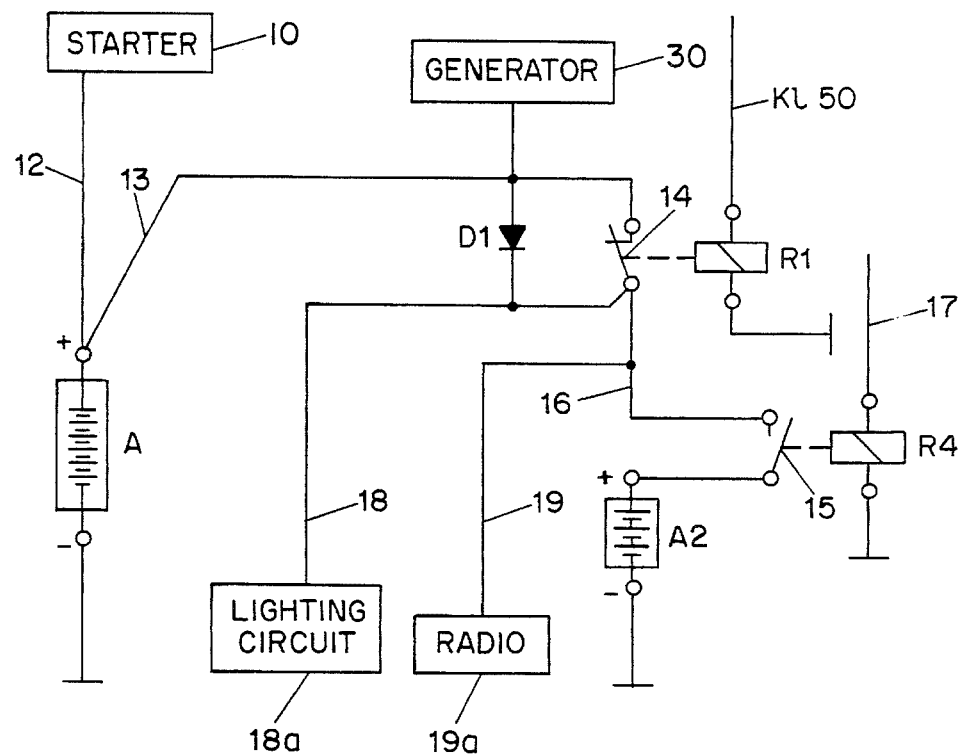
FIG. 1 is a schematic circuit diagram showing a representative voltage supply arrangement in accordance with the invention including an auxiliary battery capable of being connected in parallel with the main battery of the vehicle.

In the circuit diagrams of the several embodiments shown in the drawings, electrical component or part designations conventionally used in the automotive field are employed in some instances and the same reference numerals are used in different figures to refer to parts of the same kind or function.

In the typical embodiments described herein, a motor vehicle has an internal combustion engine with a starter and an electric circuit for low-power components such as lights, referred to hereinafter as the lighting circuit. A radio may be connected to the lighting circuit as well. The motor vehicle is preferably provided with an arrangement for automatically stopping and restarting the engine in accordance with particular operating conditions. The reason for this mode of operation is the endeavor to avoid fuel consumption during idling or in the driven mode when the engine is being driven by the vehicle, as when decelerating or travelling downhill. Three operating conditions are distinguished:

1. When the engine is running, a generator supplies the electric circuit of the vehicle with power and charges the battery.

2. When the engine is not running, the generator is no longer delivering any power and the vehicle lighting circuit is supplied by the battery.

3. When the engine starter is operated, both the starter and the vehicle lighting circuit are drawing power from the battery.

In the typical embodiment shown in FIG. 1, a main vehicle battery A and an auxiliary battery A2 are connected in parallel with the negative terminals of the batteries being grounded. The batteries A and A2 have about the same voltage rating.

A starter 10 is connected to the main battery A by a conductor 12. Another conductor 13 connects the positive terminal of the battery A through a relay contact 14, another conductor 16 and another relay contact 15 to the positive terminal of the auxiliary battery A2.

The relay contact 14 is part of a relay R1 which is capable of being actuated by a control signal for the starter 10 received through a terminal 50. The relay contact 15 is part of a relay R4 and is actuated through a conductor 17 by a turn-off signal for the engine (not shown). A conductor 18 leads from the conductor 16 extending between the relay contacts 14 and 15 to a lighting circuit 182 and a conductor 19 leads to a radio 192. When the engine is running, both relay contacts 14 and 15 are closed. The relay R1 opens the contact 14 when it receives a start signal, that is, upon actuation of the starter and the relay R4 closes the contact 15 when the engine switch is closed, that is, as long as the engine is running. When the engine is turned off, the relay contact 15 opens and the auxiliary battery A2 is disconnected from the rest of the circuit. As soon as the starter is actuated, the relay R1 is actuated and the relay contact 14 opens. At the same time, the relay R4 closes the contact 15. The conductors 18 and 19 for the lighting circuit and the radio are then supplied exclusively from the auxiliary battery A2, while the starter receives power only from the main battery A by way of the conductor 12. In these circumstances, the voltage on the conductor 16 is higher than the voltage on the conductor 13. To prevent a total failure of the lighting circuit or the radio in the event of a malfunction of the relays or of the auxiliary battery, the conductors 13 and 16 are connected to the main battery A through a diode D1 which bridges the relay contact 14.

In another embodiment (not shown), the auxiliary battery A2 is so arranged so that it is connected in parallel with the main battery A when the engine is switched off as well, and it supplies the conductors 18 and 19 independently of the main battery only during operation of the starter.

Figure 2:
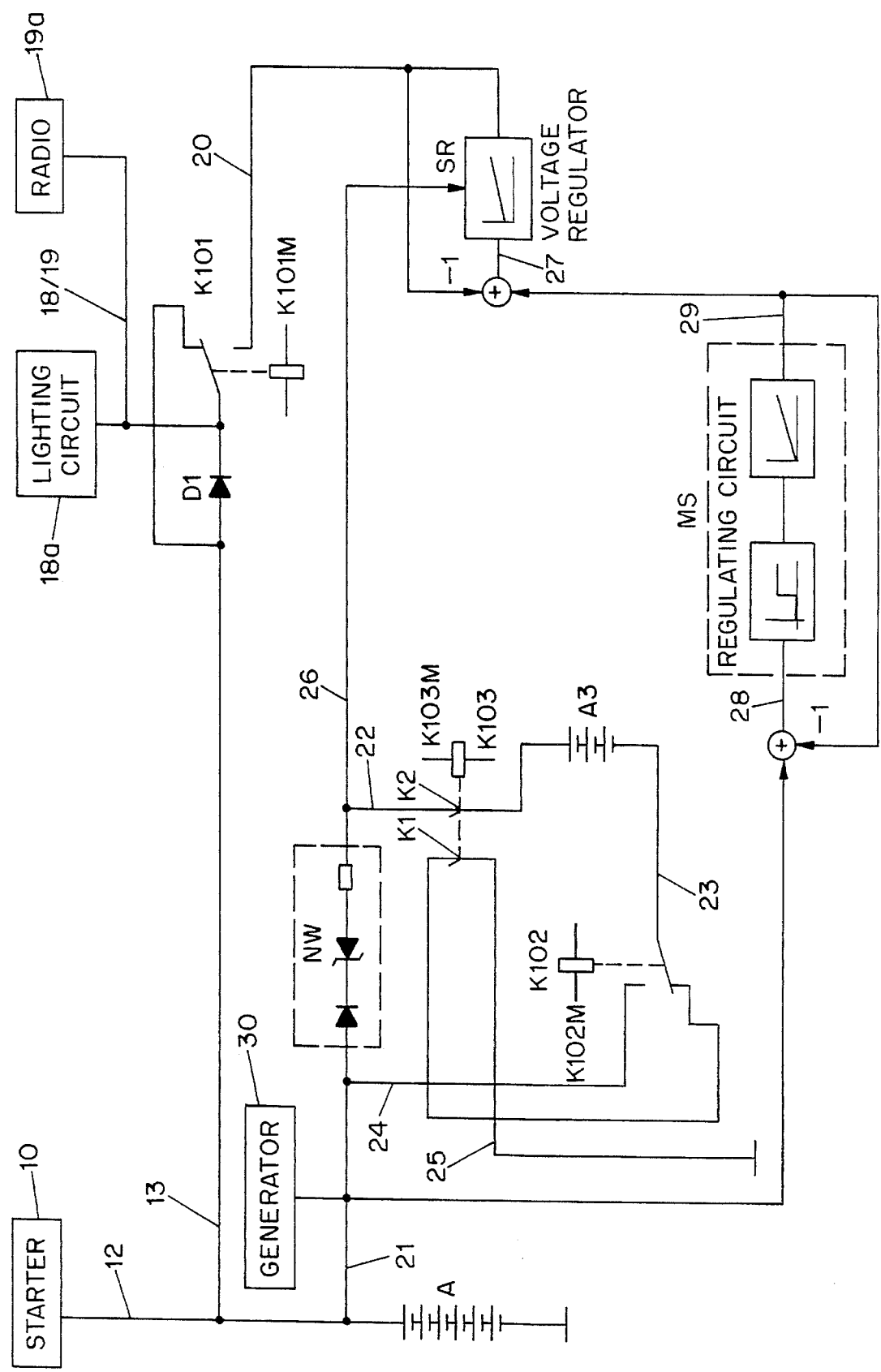
FIG. 2 is a schematic circuit diagram showing another embodiment of the invention including an auxiliary battery capable of being connected in parallel or in series with the main battery of the vehicle and a voltage-regulating unit.

FIG. 2 illustrates another embodiment having an auxiliary battery A3 arranged to be connected in series with the main battery A. A conductor 12 leads to the starter 10 and a conductor 13 leads to the conductors 18 and 19 for the lighting circuit 18a and radio 19a by way of a diode D1. The conductors 18 and 19 may also be supplied with power by way of a conductor 20. To connect the conductors 18 and 19 and the-conductor 20, a relay K101 with corresponding contact is provided, the relay plunger K101M being coupled to that contact. In the embodiment shown in FIG. 2, the contact for the relay K101 is open when the ignition is turned on, the conductors 18 and 19 then being supplied from the main battery A.

Another conductor 21 is also connected to the main battery A in parallel with the conductor 13. The conductor 21 leads to a conventional passive network NW (shown in dotted outline) arranged to charge the auxiliary battery A3 and/or to supply it with a maintenance charging current. Between the network NW and the positive terminal of the auxiliary battery A3, a conductor 22 has an additional relay K103 with double relay contacts K1 and K2, the contact K2 being part of the conductor 22. In addition, another relay K102 connects a conductor 23 from the other terminal of the auxiliary battery A3 either to the conductor 21, that is, to the main battery A, by way of a conductor 24 or to ground by way of a conductor 25. The relay contact K1 is grounded by the conductor 25. Controlled actuation of the relays K101, K102 and K103 is effective to switch the auxiliary battery A3 from a parallel connection with the main battery A for charging to a series connection with the main battery A for supplying the conductor 20 and/or the conductor 18/19, and hence the lighting circuit and the radio. For this purpose, a conventional circuit logic (not shown) is provided to actuate the relays in accordance with the operating conditions previously described.

The network NW contains components for carrying out the correct charging process for the auxiliary battery A3. As a rule this involves a limitation on the applied current and voltage during charging. Such networks are well known and require no further explanation. The auxiliary battery A3 preferably has a voltage rating which is intermediate between the voltage rating of the main battery A and one-half that value. As in the case of the auxiliary battery A2 in FIG. 1, the capacity and hence the weight and bulk of the battery A3 are substantially less than those of the main battery A. The network NW should, of course, be properly matched to the described conditions.

The voltage of the auxiliary battery A3 is supplied by way of a conductor 26 from the output side of the network NW to a voltage regulator SR, where it is stepped down to a selected voltage, and finally, by way of a conductor 20 and a relay K101, to the conductor 18/19 for the lighting circuit and radio. The voltage regulator SR is a fixed-voltage regulator of the well-known type consisting of power transistors and may, for example, be the voltage regulator designated LM196 and supplied by National Semiconductor. The construction of such voltage regulators for regulating a direct-current voltage to a fixed value, or, by way of a regulating input, to a preassigned variable value, is likewise known and does not require further explanation. In accordance with the principle of a voltage regulator, the voltage on the conductor 20 is fed back to an input conductor 27 for the voltage regulator.

The control voltage for the voltage regulator SR comes from another regulating circuit MS (shown in dotted outline) connected to the conductor 27. An input conductor 28 for that circuit is connected to the main battery A, or to the conductor 21. Accordingly, the terminal voltage of the main battery A is the input voltage for the regulator circuit MS. In the regulating circuit MS, a voltage value is produced that follows the terminal voltage of the main battery at a limited rate of change. That is, if the voltage of the main battery decreases rapidly, say upon actuation of the starter, there is a so-called reference voltage at a conductor 29 which follows the terminal voltage but at a slow rate. In this circuit as well, there is feedback to the input conductor 28. The voltage regulator receives the reference voltage as an input parameter so that, when the starter is running, a voltage greater than the terminal voltage of the main battery A, which changes with it but slowly, is available in the lighting circuit and radio conductor 18/19. The regulating circuit MS may be arranged in various well-known ways. For example, it may be in the form of a discriminator and an integrator made up of suitable operating amplifiers in combination with other passive components.

In a modification of the embodiment previously described with reference to FIG. 2, the regulating circuit MS is arranged to produce a constant output voltage so that the voltage regulator SR also provides a constant voltage. It is also possible to provide an embodiment without the regulating circuit MS, but with some other circuit arranged to produce a constant voltage.

Two different principles of operation are possible for the circuit shown in FIG. 2 with either a variable reference voltage or for a predetermined constant reference voltage. The auxiliary battery A3 may be connected in series with the main battery either as soon as the engine is stopped or not until the starter is actuated. In normal operation, that is, with the engine running, the relay K101 is in the position shown in FIG. 2, that is, disconnected from the conductor 20. The contacts K1 and K2 of the relay K103 are closed, and the relay K102 is in the position shown in the drawing, that is, the conductor 23 is grounded. The auxiliary battery A3 is thus in parallel with the main battery A and both batteries are charged by the generator 30.

To make the switch, that is, after the engine stops or not until it is being started, the relay K102 is actuated so that the conductor 23 is then connected to the main battery by way of the conductors 24 and 21. The auxiliary battery A3 is thus connected in series. The sum of the voltages of the main battery A and the auxiliary battery A3, or less, is made available to the lighting circuit and radio conductor 18/19 by way of the voltage regulator SR.

When the vehicle is stationary, the auxiliary battery A3 is disconnected from the rest of the circuit by the relays K102 and K103. The embodiments shown in FIGS. 1 and 2 may be similarly arranged using electronic power components, for example, thyristors or the like.

Figure 3:
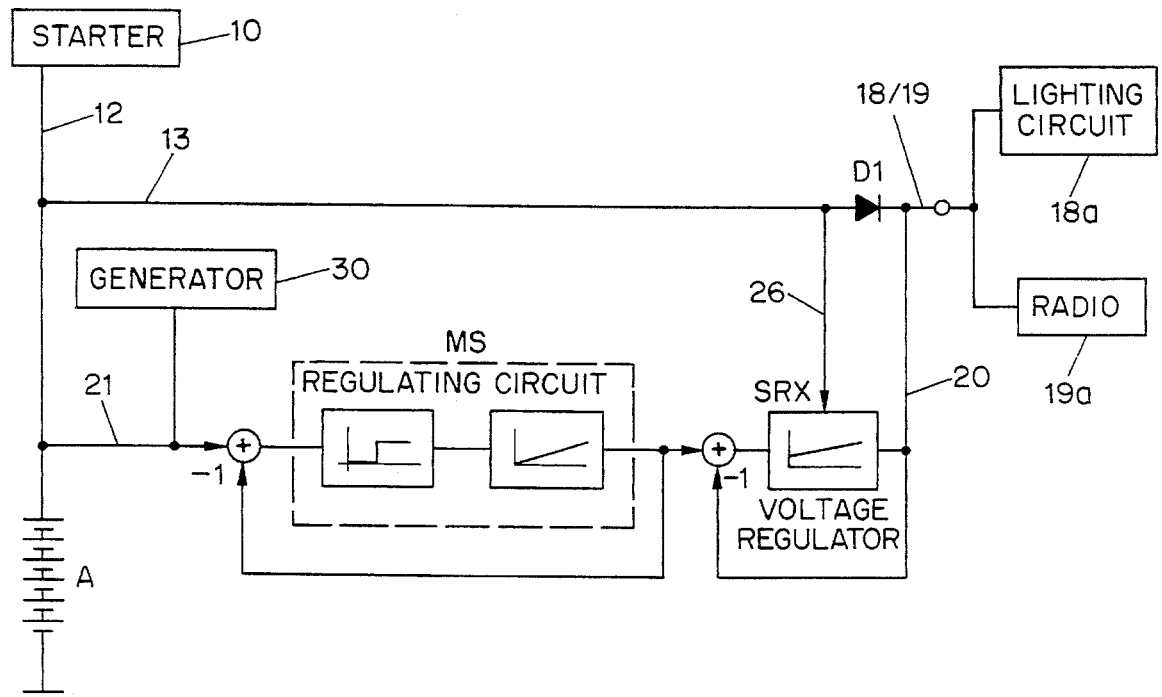
FIG. 3 is a schematic circuit diagram of a further embodiment including a main vehicle battery and voltage-regulating unit.

FIG. 3 shown a circuit arrangement which does not require any auxiliary battery. As in the circuits of FIGS. 1 and 2, the conductor 13 leads to the conductor 18/19 for the lighting circuit and radio by way of a diode D1. In the conductor 21, which is also supplied by the main battery A, there is a regulating circuit MS to generate the reference voltage described above as a function of the battery terminal voltage. The regulating circuit MS is followed by a voltage regulator SRX which is supplied with battery terminal voltage by way of the conductor 26. The voltage regulator SRX contains a conventional DC—DC converter circuit containing, for example, an oscillator, a transformer and diodes, for converting a low direct-current voltage into a higher direct-current voltage. Thus, it is possible to provide a voltage at the output conductor 20 of the voltage regulator SRX for the lighting circuit and radio conductor 18/19 that is above the actual terminal voltage. No additional actuating devices such as the relays used in FIGS. 1 and 2 are required. Instead, the circuit may be arranged so that the voltage regulator SRX only takes effect when the terminal voltage is below a certain value.

Preferably, in all embodiments which use a reference voltage, a lower limit of the reference voltage is provided. This serves to prevent failure of sensitive components or circuits due to insufficient voltage.

The use of a reference voltage permits precise voltage regulation with adaptation to the battery voltage, which is desirable for reasons of capacity, without giving rise to adverse effects in the lighting circuit or radio. The rate of change of the reference voltage is preferably limited to about 0.15 V/second.

FIGS. 4a–4e show the voltages produced under several operating conditions. In those figures, U2 designates the voltage normally present in the vehicle circuit when the engine is running, otherwise known as the output voltage, which ordinarily rises to about 13.8 V. U1 is the lowest voltage occurring during actuation of the starter, and may fall as low as about 7 V. The time when the engine is switched off is designated t1 and the times t2 and t3 designate the beginning and the end of starter actuation. The dotted line represents the voltage of the vehicle battery A, while the voltage in the lighting circuit, which may include a radio, is shown as a solid line.

FIG. 4a shows the voltages in the circuit illustrated in FIG. 1 during operation. That circuit is designed so that the batteries A and A2 are always in parallel. Upon actuation of the starter at time t2, the batteries are separated and the lighting circuit is supplied by the auxiliary battery A2. The voltage drop after the time t1 occurs as a result of the loss of the charging voltage from the generator. A second, more pronounced, voltage drop in the lighting circuit after the time t2 occurs because the lighting circuit is then being supplied only by the auxiliary battery A2.

FIG. 4b likewise relates to operation of the circuit shown in FIG. 1. However, the batteries are separated from each other as soon as the engine is switched off at the time t1. Until the time t2, the lighting circuit is supplied by the vehicle battery A alone. When the starter is actuated, the lighting circuit is switched to the auxiliary battery A2. Accordingly, there is then once more a slight voltage drop in the lighting circuit, but less than in FIG. 4a.

FIGS. 4c and 4d relate to the circuit illustrated in FIG. 2, i.e., an embodiment with a constant reference voltage as the input for the voltage regulator, that is, with no variable reference voltage. The lighting circuit is supplied by the vehicle battery A until the time t2 just as in the circuit of FIG. 4b. Upon actuation of the starter, the auxiliary battery A3 is connected in series and the voltage regulator supplies the lighting circuit with the desired voltage. FIG. 4d relates to the case in which the voltage regulator is actuated as soon as the engine is switched off. The actuation of the starter does not affect the voltage in the lighting circuit. The voltage regulator will become inactive only when the generator is producing a higher voltage than the voltage supplied by the voltage regulator at the time t3.

FIG. 4e also relates to the circuit shown in FIG. 2, but with a variable reference voltage. As in FIG. 4d, voltage regulation starts when the engine is switched off, but the voltage does not decline as rapidly in FIG. 4e. Because of the preassignment of the reference voltage, which has a limited rate of change, the voltage produced by the voltage regulator likewise varies only slowly and with it the voltage in the lighting circuit. The lighting circuit voltage curve, shown as a solid line, has the shape of a ramp. The reference voltage is determined by the terminal voltage of the vehicle battery A. Between the times t2 and t3, no further decline in lighting circuit voltage is perceptible in FIG. 4e. To avoid failure of especially sensitive electrical components such as radios, a minimum level is maintained for the reference voltage in the regulating circuit MS of FIG. 2.

In each of the circuits described, the voltage variations that occur are so slight that no significant effects are produced in the lighting circuit, and there are no functional outages.

Although the invention has been described herein with reference to specific embodiments, many modifications and variations therein will readily occur to those skilled in the art. Accordingly, all such variations and modifications are included within the intended scope of the invention.

We claim:

1. A method for controlling the vehicle circuit supply voltage in a motor vehicle having at least one high-power component and at least one low-power component in a low-power circuit and a main vehicle battery capable of being supplied by a generator comprising providing an auxiliary battery normally connected in parallel with the main vehicle battery and, when a high-power component is being supplied by the main vehicle battery, disconnecting the auxiliary battery from the main vehicle battery so that the voltage in the low-power circuit is drawn from the auxiliary battery to limit the rate of change of at least one of the vehicle current supply voltage and the voltage available in the low-power circuit.

2. A method according to claim 1 including connecting the main battery and the auxiliary battery in parallel to receive electrical energy from the generator when the engine is running and disconnecting the auxiliary battery when the engine is turned off so that the vehicle circuit is supplied by the main battery, and connecting the low-power circuit to the auxiliary battery and the high-power component to the main battery for starting the engine.

3. A method according to claim 1 including connecting the main battery and the auxiliary battery in parallel and supplying them with electrical energy from the generator when the engine is running and maintaining the main battery and the auxiliary battery connected in parallel after the engine has been turned off and disconnecting the auxiliary battery from the main battery and connecting it to supply the low-power circuit for starting the engine from the main battery.

4. A method according to claim 1 including connecting an auxiliary battery in series with the main battery when the high-power component is actuated so that the high-power component is supplied from the main battery and the low-power circuit is supplied by both batteries connected in series.

5. A method according to claim 1 including connecting an auxiliary battery of lower voltage than the main battery voltage in series with the main battery upon switching-off of the engine and/or starting of the engine and supplying the low-power circuit with voltage from both batteries connected in series.

6. A method according to claim 4 including maintaining the voltage supplied by the main battery and the auxiliary battery connected in series constant by a voltage regulator.

7. A method according to claim 4 including using the voltage in the main battery to define a reference voltage which follows the main battery voltage at a limited rate of change, and regulating the voltage of the series circuit according to the value of the reference voltage.

8. A method according to claim 1 including regulating the low-power circuit voltage to a selected value after the engine has been switched off.

9. A method according to claim 8 including using the voltage of the main battery to determine a reference voltage which follows the main battery voltage at a limited rate of change, and regulating the low-power circuit voltage according to the value of the reference voltage.

10. A method according to claim 8 including imposing a lower limit on the reference voltage.

11. A method according to claim 1 including limiting the rate of change of at least one of the low-power circuit voltage, the vehicle circuit voltage, and the reference voltage to 0.15 V/second.

12. Apparatus for controlling the vehicle current supply voltage in a motor vehicle containing an engine, a main battery, a generator, and at least one high-power component and a low-power circuit to supply voltage to at least one low-power component comprising control means for limiting the rate of change of voltage in the vehicle current supply circuit in response to operation of a high-power component, a low-power component, or the vehicle generator, the control means including an auxiliary voltage source arranged to be connectable in parallel with the main battery and switch means for connecting and disconnecting the auxiliary voltage source from the main battery.

13. Apparatus according to claim 12 including switch means for connecting the auxiliary voltage source to the low-power circuit when the high-power component is connected to the main battery.

14. Apparatus according to claim 12 wherein the auxiliary voltage source has a voltage rating which is about the same as the voltage rating of the main battery.

15. Apparatus according to claim 12 including an auxiliary voltage source arranged to be connectable in series with the main battery.

16. Apparatus according to claim 15 including switch means arranged to disconnect the auxiliary voltage source from the main battery when the engine is turned off.

17. Apparatus according to claim 15 including switch means for connecting the auxiliary voltage source in series with the main battery when the high-power component is connected to the main battery to increase the voltage available for the low-power circuit and voltage regulator means for controlling the output voltage of the voltage sources connected in series.

18. Apparatus according to claim 15 including voltage regulator means arranged to maintain the output voltage of the combined voltage sources constant.

19. Apparatus according to claim 15 wherein the auxiliary voltage source has a voltage rating between about half of the voltage rating of the main battery and the voltage rating of the main battery.

20. Apparatus according to claim 17 including regulating circuit means providing a reference voltage which is dependent upon the voltage of the main battery wherein the output voltage of the voltage regulator is capable of being adjusted to that reference voltage.

21. Apparatus according to claim 20 wherein the switch means is arranged to connect the auxiliary voltage source in series with the main battery when the engine is turned off.

22. Apparatus according to claim 12 including voltage stabilization circuit means capable of being connected in series with the main battery.

23. Apparatus according to claim 22 wherein the voltage stabilization circuit means includes regulating circuit means in which a reference voltage is produced which is dependent upon the voltage of the main battery and a voltage regulator with a DC—DC converter to provide a regulated voltage which is higher than the main battery voltage, and wherein the voltage at the output of the voltage regulator is capable of being adjusted to the reference voltage.

24. Apparatus according to claim 12 including means for turning off and starting the engine as a function of selected driving conditions.

* * * * *

UNITED STATES PATENT AND TRADEMARK OFFICE
CERTIFICATE OF CORRECTION

PATENT NO. : 5,455,463
DATED : October 3, 1995
INVENTOR(S) : Langnickel et al.

It is certified that error appears in the above-identified patent and that said Letters Patent is hereby corrected as shown below:

Column 3, line 19, "182" should read --18a--;

Column 3, line 20, "192" should read --19a--;

Column 7, line 56, "claim 8" should read --claim 7--.

Signed and Sealed this

Twenty-first Day of May, 1996

Attest:

BRUCE LEHMAN

Attesting Officer                Commissioner of Patents and Trademarks